C. S. FRANKLIN.

AERIAL CONDUCTOR FOR WIRELESS TELEGRAPHY.

APPLICATION FILED JULY 23, 1920.

Reissued Feb. 15, 1921.

15,041.

2 SHEETS—SHEET 1.

Inventor

CHARLES S. FRANKLIN

By his Attorney

Ira J Adams

C. S. FRANKLIN.

AERIAL CONDUCTOR FOR WIRELESS TELEGRAPHY.

APPLICATION FILED JULY 23, 1920.

Reissued Feb. 15, 1921. 15,041.

2 SHEETS—SHEET 2.

Inventor
CHARLES S. FRANKLIN
By his Attorney
Lea J Adams

UNITED STATES PATENT OFFICE.

CHARLES S. FRANKLIN, OF LONDON, ENGLAND, ASSIGNOR, BY MESNE ASSIGNMENTS, TO RADIO CORPORATION OF AMERICA, A CORPORATION OF DELAWARE.

AERIAL CONDUCTOR FOR WIRELESS TELEGRAPHY.

15,041. Specification of Reissued Letters Patent. Reissued Feb. 15, 1921.

Original No. 1,322,101, dated November 18, 1919, Serial No. 82,042, filed March 4, 1916. Application for reissue filed July 23, 1920. Serial No. 398,540.

DIVISION B.

*To all whom it may concern:*

Be it known that I, CHARLES SAMUEL FRANKLIN, a subject of the King of Great Britain, residing at Marconi House, Strand, London, England, have invented new and useful Improvements in or Connected with Aerial Conductors for Wireless Telegraphy, of which the following is a specification.

This application is a division of my original Patent No. 1,322,101.

The object of this invention is to provide an improved wireless aerial system which shall be particularly suitable for a receiving station used in conjunction with but separated from a transmitting station for duplex telegraphy.

It is known that an aerial system consisting of two frames at right angles to each other, and used in conjunction with a radio-goniometer, can receive best from any two opposite directions and eliminate signals from any two opposite directions at right angles to the first.

According to this invention two similar directional aerial systems, each consisting of two vertical frames at right angles to one another, are erected at equal distances from an adjacent transmitting station and at a distance apart in the direction of motion of the wave being received which is a considerable fraction of the wave length it is desired to receive. The moving coil of the radio-goniometer connected to each directional aerial system is connected to a pair of wires leading to the receiving apparatus which is preferably arranged mid-way between them. Condensers are introduced into the circuits comprising the leading wires, the moving coils of the radio-goniometers, and the coils of the receiving apparatus in order to tune them to the desired wave.

Figure 1:
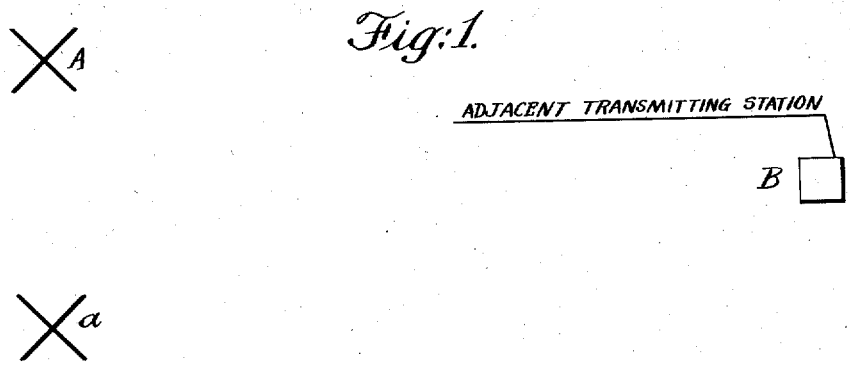
Figure 2:
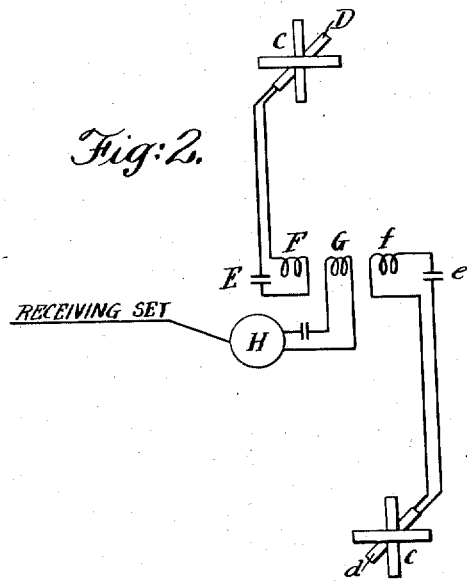
Figure 3:
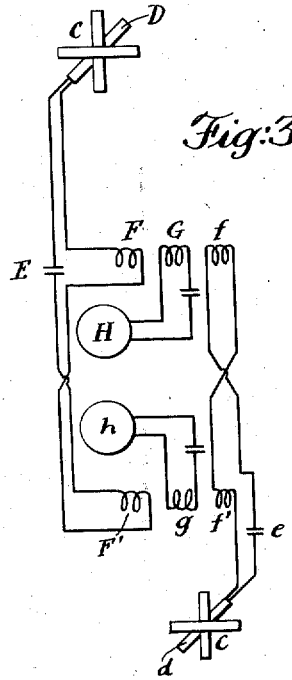
Figure 4:
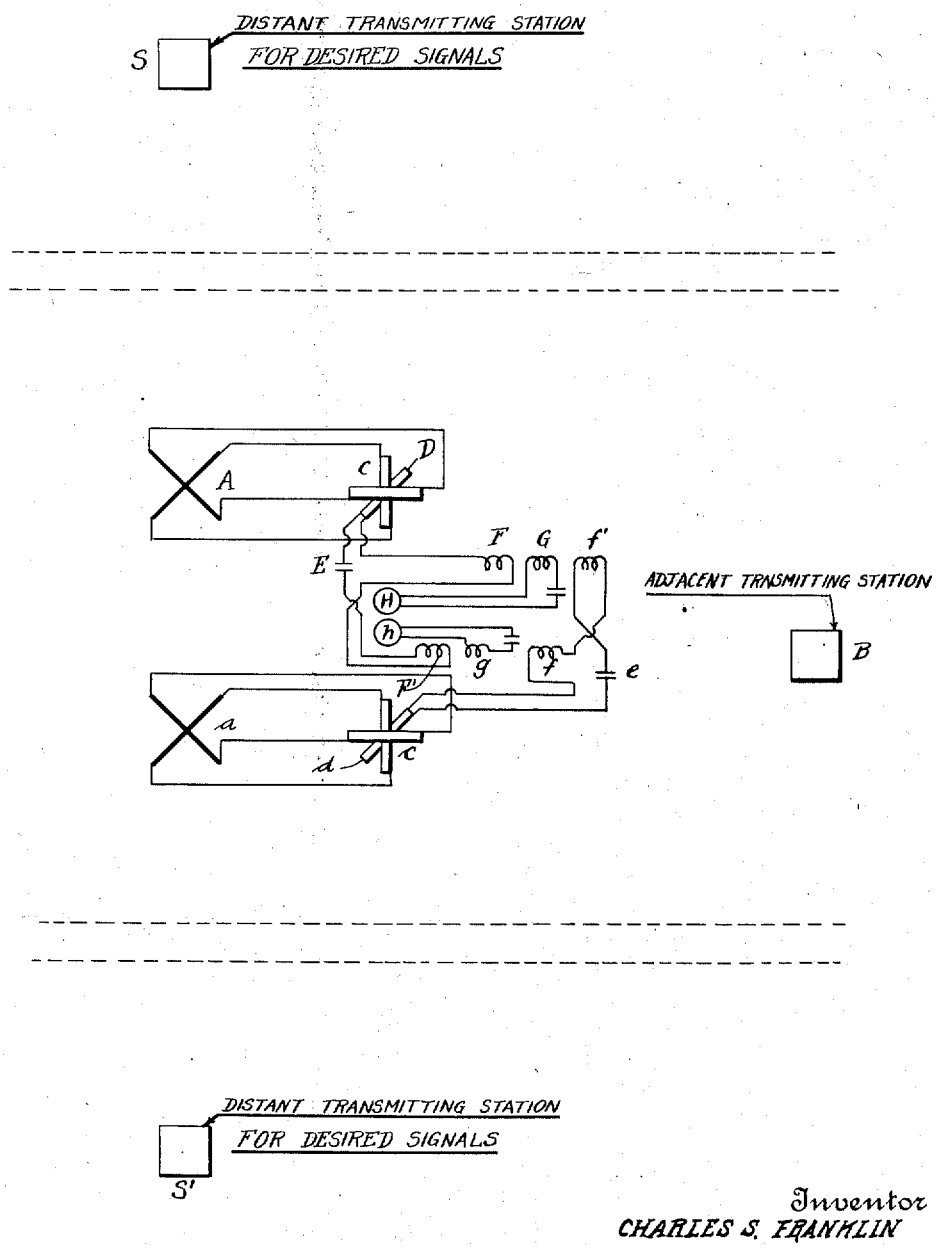

The invention is illustrated by the accompanying diagrams, in which Figure 1 shows a preferred relation between the receiving station and the transmitting station; Fig. 2 shows the circuits which I may employ at a receiving station in accordance with one form of my invention; Fig. 3 shows circuits which I may employ at a receiving station, in accordance with another form of my invention, and Fig. 4 is a diagram of the entire system according to the form of the invention claimed herein.

In Fig. 1, A, *a* are two aerial or atennæ systems each consisting of two equal vertical frames at right angles to each other. They are situated at equal distances from an adjacent transmitting station B which may have any type of transmitting aerial, and the distance between them is a considerable fraction of the wave length it is desired to receive.

Presuming the station is arranged so that the direction of the received signals coincides with the line joining A, *a*, then the maximum receiving power of the combination is obtained when A and *a* are placed at a distance equal to one-half of the received wave length.

It is, however, generally more useful to place them at a distance apart equal to one quarter of the received wave length.

Although it is advisable to arrange A, *a*, in the line of the desired communication, considerable variation from this can be allowed.

In Fig. 2, C, *c* are two radio-goniometers the fixed coils of which are connected in the usual way to the aerial or antennæ systems A, *a* respectively.

The moving coils D, *d* of the radio-goniometers are connected through tuning condensers E, *e* to coils F, *f* arranged to act upon a common coil G which is connected up to the receiving apparatus H through the necessary tuning appliances.

As the directional systems A, *a* are at equal distances from the transmitting station B, the setting of the coils D, *d* which is best for signals in the line A, *a* will prevent the waves from B, moving at right angles to the line A, *a*, from influencing the coils D, *d*, these coils lying then in the plane of the field caused by the waves from B.

Supposing the raido-goniometer coils are set to eliminate waves from B and that A and *a* are a quarter wave length apart, then waves coming in the line joining A and *a* will produce in the circuits connected to the radio-goniometers oscillations which are out of phase 90 degrees. If these circuits have their respective capacities and inductances adjusted in opposite senses so that the phases of the oscillations in the two circuits are advanced and retarded 45 degrees respectively, then waves coming from one direction will produce in the circuits oscillations which oppose, and waves coming from the other direction will produce oscillations which are in phase.

In Fig. 3 I have illustrated a specific arrangement of the goniometer and receiving apparatus particularly adapted for use in the manner just described. According to this arrangement there are two receivers H, *h*, the circuits of which include the coupling coils G, *g*. The radio-goniometer circuits include in addition to the coils D, *d* and the condensers E, *e* previously mentioned, the coupling coils F, *f* and *f'*, F' associated with the coils G and *g*, respectively. By merely crossing the wires of each of the goniometer circuits as shown in this arrangement, I have accomplished the result that, when the radio-goniometer circuits are adjusted as above described, the oscillations in phase with each other in the two circuits oppose as regards one receiver and add as regards the other, waves coming from one direction will actuate only the one receiver and waves from the opposite direction will actuate only the other receiver.

It is therefore possible to receive from stations in opposite directions on the same wave-length without mutual interference and at the same time to transmit from an adjacent transmitting station.

It will be seen from the foregoing that, in the operation of my present invention, the coils D, *d* are set at such an angle that they lie in the plane of the field caused by the waves from the adjacent transmitting apparatus B, thus eliminating interference from B, and the constants of the circuits of the coils D, *d* are set so that these circuits respond best to the same wave length, namely that of the station such as S from which it is desired to receive, but so that the phase angle between the current and electromotive force in one such circuit is advanced and the phase angle between the current and electromotive force in the other circuit is retarded sufficiently so that the total difference in phase between the currents in these two circuits, due to both the readjustments just mentioned and to the geographical displacement between the antennæ portions in the line of motion of the waves amounts to 180 degrees. The other coupling coils in the circuits of the coils D, *d*, such as F, *f* (Fig. 2) or F, F' *f*, *f'* (Fig. 3) are then so arranged with respect to the coils G (Fig. 2) or G and *g* (Fig. 3) that the currents in coils D, *d* due to any given set of waves, such as those from S, or S', produce cumulative or additive effects on the coil G, or the coil *g* as the case may be, while waves arriving from the reverse direction produce effects which oppose in the receiving coil or coils, thus neutralizing or canceling such waves so far as any given receiving circuit is concerned, and so far as the system is concerned if only one receiving circuit is in use.

It will be seen that my present invention comprises spaced antennæ combined with means whereby the receiving system may discriminate between waves arriving from opposite directions or in opposite sense, along substantially the same line, while, by combining the foregoing means with directive antennæ, I am enabled at the same time to prevent interference from a third transmitting station, such for instance as the adjacent transmitting station B. I consider these results to be highly valuable and to be novel. While it is necessary according to this form of my invention that the two stations, such as S and S' whose effects are balanced, be on opposite sides of the line from B to the receiving station, they do not need to be in the line A, *a* or in exact alinement through the receiving station, nor does the third station, such as B, require to be in a line at right angles to the line A, *a*.

What I claim is:

1. At a radio receiving station in combination a plurality of antenna system portions spaced apart an appreciable fraction of a wave length in the direction of motion of the signal wave to be received, said station lying between two sending stations from at least one of which it is desired to receive, a local circuit, and means associating said antennæ portions with said circuit, and causing the system to discriminate between waves from said two stations.

2. At a radio receiving station, a plurality of antenna system portions spaced apart an appreciable fraction of a wave length in line with the source of a desired signal and also in line with the source of an undesired signal, said receiving station being between said signal sources, a local circuit, means for producing in said circuit such phase relations that desired signals affecting said portions in desired succession are cumulatively received, and undesired signals affecting them in reverse order are differentially received.

3. At a radio receiving station, a plurality of antenna system portions spaced apart an appreciable fraction of a wave length in line with the source of a desired signal and also in line with the source of an undesired signal, field producing means associated with said alined portions, angularly adjustable coils associated with said means, and a local circuit associated with said coils.

4. At a radio receiving station, a plurality of directional antennæ spaced apart a distance substantially one quarter of a wave length in the direction of desired and interfering waves, means for shifting the phases of effects produced by undesired signals, means for opposing said effects, and means for utilizing the desired waves.

5. A radio signaling system comprising a receiving station having two directive antennæ spaced apart a material fraction of a wave length in the direction of desired reception, and two distant transmitting stations in the line of said antennæ, said receiving station including two receiving circuits and two circuits each coupling each of said antennæ to each of said receiving circuits, said coupling circuits having currents therein due to a given signal 180 degrees apart and each coupled to the receiving circuits cumulatively as to waves from one of said distant stations and in opposition as to waves from another of said distant stations.

6. At a radio receiving station, in combination, a plurality of antenna system portions each of which is directive, said portions being spaced apart an appreciable fraction of a wave length in the direction of motion of the signal wave to be received, said station lying between two sending stations from at least one of which it is desired to receive, a third transmitting station out of alinement with said two, a local circuit, and means associating said antenna portions with said circuit causing the system to discriminate between waves from said two stations, and means associated with said means for preventing interference from said third station.

7. At a radio receiving station, separated antenna system portions located to receive desired signals in said portions in one order of succession, and an undesired signal in the reverse order of succession, receiving means and means associated therewith and with the said portions for causing effects received in desired order to be retained and those in an undesired order to be canceled.

C. S. FRANKLIN.